United States Patent
Upmanue et al.

(10) Patent No.: US 10,902,273 B2
(45) Date of Patent: Jan. 26, 2021

(54) VEHICLE HUMAN MACHINE INTERFACE IN RESPONSE TO STRAINED EYE DETECTION

(71) Applicants: DENSO International America, Inc., Southfield, MI (US); Denso Corporation, Kariya (JP)

(72) Inventors: Vikas Upmanue, Novi, MI (US); Sean Bleicher, Fenton, MI (US); Te-ping Kang, Ann Arbor, MI (US); Yu Zhang, Farmington Hills, MI (US); Bilal Alasry, Dearborn, MI (US); Scott Walenty, Farmington Hills, MI (US); Doua Vang, Waterford, MI (US); Tetsuya Hara, Novi, MI (US)

(73) Assignees: Denso International America, Inc., Southfield, MI (US); Denso Corporation

( * ) Notice: Subject to any disclaimer, the term of this patent is extended or adjusted under 35 U.S.C. 154(b) by 99 days.

(21) Appl. No.: 16/116,716

(22) Filed: Aug. 29, 2018

(65) Prior Publication Data
US 2020/0074197 A1    Mar. 5, 2020

(51) Int. Cl.
*G06K 9/00* (2006.01)
*G01C 21/36* (2006.01)

(52) U.S. Cl.
CPC ..... *G06K 9/00845* (2013.01); *G01C 21/3679* (2013.01); *G06K 9/00221* (2013.01); *G06K 9/00335* (2013.01); *G06K 9/00791* (2013.01)

(58) Field of Classification Search
CPC ........... G06K 9/00845; G06K 9/00221; G06K 9/00335; G06K 9/00791
See application file for complete search history.

(56) References Cited

U.S. PATENT DOCUMENTS

| 9,472,163 B2 | 10/2016 | Gould et al. |
| 9,916,503 B2 | 3/2018 | Cho |
| 2006/0208169 A1* | 9/2006 | Breed ............... B60N 2/002 250/221 |
| 2012/0093358 A1 | 4/2012 | Tschirhart |

(Continued)

FOREIGN PATENT DOCUMENTS

| JP | 2007249567 A | 9/2007 |
| JP | 2007304712 A | 11/2007 |

(Continued)

OTHER PUBLICATIONS

Fletcher, Luke "A Sign Reading Driver Assistance System Using Eye Gaze" IEEE (Year: 2005).*

*Primary Examiner* — Kim Y Vu
*Assistant Examiner* — Molly Delaney
(74) *Attorney, Agent, or Firm* — Brooks Kushman P.C.

(57) ABSTRACT

A vehicle system in a vehicle, comprising a first sensor configured to survey an environment proximate to the vehicle, including an object outside of the vehicle, a second sensor located within a vehicle cabin and configured to obtain data indicative of facial information of an occupant of the vehicle, and a processor in communication with the first and second sensors and programmed to output information regarding the object on a display of the vehicle system in response to the data indicative of the facial information indicating that the occupant is viewing the object outside of the vehicle.

19 Claims, 5 Drawing Sheets

(56) References Cited

U.S. PATENT DOCUMENTS

| | | | |
|---|---|---|---|
| 2016/0001781 A1* | 1/2016 | Fung | G16H 50/20 |
| | | | 701/36 |
| 2016/0267335 A1* | 9/2016 | Hampiholi | G06F 3/013 |
| 2018/0081359 A1* | 3/2018 | Otaki | B60W 40/09 |
| 2019/0056741 A1* | 2/2019 | Zych | G08G 1/166 |
| 2019/0156134 A1* | 5/2019 | Krishnan | G06K 9/00845 |
| 2019/0283762 A1* | 9/2019 | el Kaliouby | B60W 40/08 |
| 2020/0051529 A1* | 2/2020 | Higashiyama | G02B 27/0101 |

FOREIGN PATENT DOCUMENTS

| | | | |
|---|---|---|---|
| JP | 2008082822 A | 4/2008 |
| JP | 2009096384 A | 5/2009 |
| JP | 2009168473 A | 7/2009 |
| JP | 2014120114 A | 6/2014 |
| JP | 2020024578 A | 2/2020 |

* cited by examiner

VEHICLE HUMAN MACHINE INTERFACE IN RESPONSE TO STRAINED EYE DETECTION

TECHNICAL FIELD

The present disclosure relates to driver status monitoring system in a vehicle, as well as a human machine interface (HMI).

BACKGROUND

Vehicles may be equipped with cameras that collect information located proximate to the vehicle. Vehicles may also be equipped with cameras that are located inside the vehicle cabin to collect information within the vehicle cabin. In-vehicle cameras may be utilized in a driver status monitoring system to observe behavior of occupants of the vehicle.

SUMMARY

According to one embodiment, a vehicle system in a vehicle comprises a first sensor configured to survey an environment proximate to the vehicle, including an object outside of the vehicle, a second sensor located within a vehicle cabin and configured to obtain data indicative of facial information of an occupant of the vehicle, and a processor in communication with the first and second sensors and programmed to output information regarding the object on a display of the vehicle system in response to the data indicative of the facial information indicating that the occupant is viewing the object outside of the vehicle.

According to a second embodiment, a method implemented in a system of a vehicle comprises determining that an occupant of the vehicle is squinting utilizing data generated from one or more vehicle sensors, identifying, via the one or more vehicle sensors, an object proximate to the vehicle that the occupant is squinting at in response to the squinting of the occupant, and output, on a display of the system, information regarding the object located outside the vehicle in response to the squinting of the occupant.

According to a third embodiment, a driver assistance system of a vehicle comprises a driver status monitor configured to monitor an occupant of the vehicle and identify one or more objects proximate to the vehicle, and a driver assistance controller configured to perform a driver assistance feature based on a target behavior, wherein the target behavior is defined based on an environment surrounding the vehicle, wherein the driver assistance controller is configured to activate a driver assistance feature to send instructions to output information regarding the object on a display of the vehicle in response to the driver squinting at the object.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
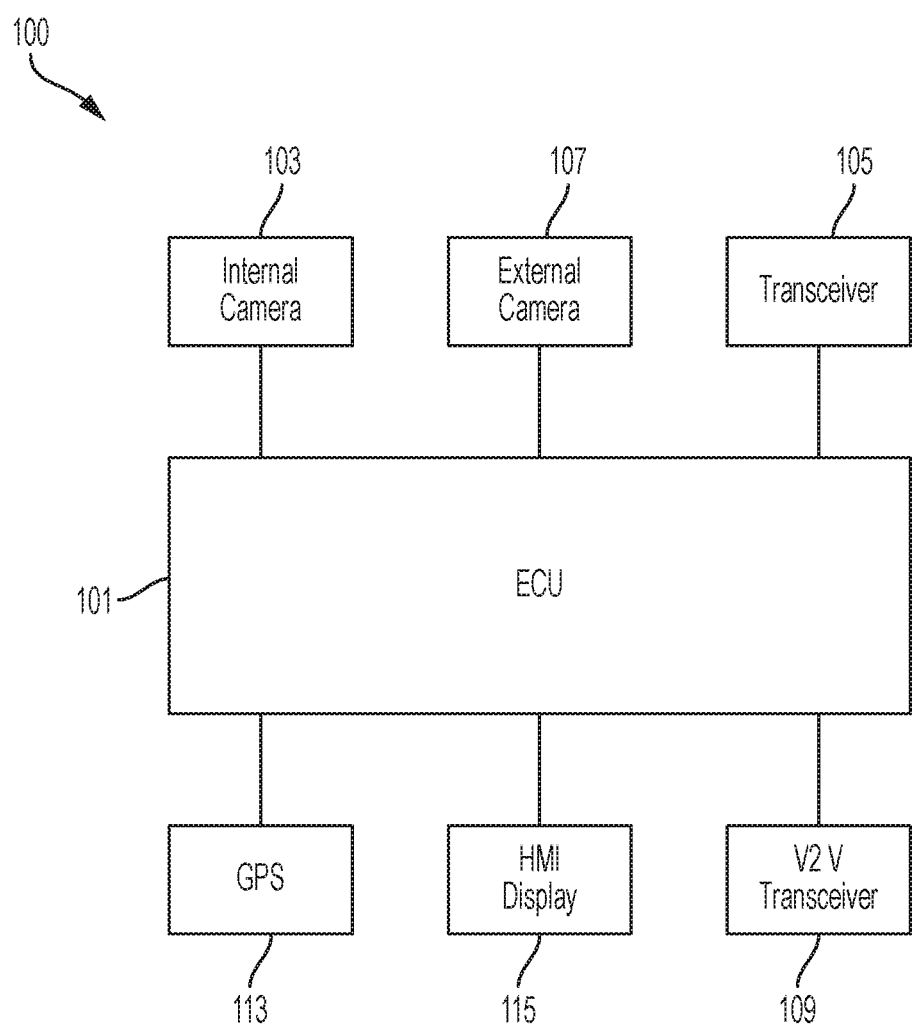
FIG. 1 illustrates an embodiment of a block diagram of a vehicle including a driver status monitoring system.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components specific processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote of a vehicle. The system 100 may include such sensors, such as various cameras, a LIDAR sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include an in-vehicle camera 103, a transceiver 105, a vehicle-to-vehicle transceiver 109, a GPS module 113, an HMI display as well as other sensors, controllers, and modules. FIG. 1 is an example system and the system 100 may include more or less sensors, and of varying types. Further, while the vehicle of FIG. 1 is shown with specific sensors in specific locations for purposes of illustration, the system 100 may be equipped with additional sensors at different locations within or on the vehicle, including additional sensors of the same or different type.

The vehicle system 100 may be equipped with a transceiver 105. The transceiver 105 may be a BLUETOOTH transceiver. In one illustrative embodiment, the system 100 uses the BLUETOOTH transceiver 105 to communicate with a user's nomadic device (e.g., cell phone, smart phone, PDA, tablet, or any other device having wireless remote network connectivity). The nomadic device can then be used to communicate with a network outside the vehicle system 100 through, for example, communication with a cellular tower. In some embodiments, tower may be a WiFi access point.

If the user has a data-plan associated with the nomadic device, it is possible that the data-plan allows for broad-band transmission and the system could use a much wider bandwidth (speeding up data transfer). In still another embodiment, nomadic device is replaced with a cellular communication device (not shown) that is installed to vehicle. In yet another embodiment, the nomadic device may be a wireless local area network (LAN) device capable of communication over, for example (and without limitation), an 802.11g network (i.e., WiFi) or a WiMax network. In one embodiment, incoming data can be passed through the nomadic device via a data-over-voice or data-plan, through the onboard BLUETOOTH transceiver and into the vehicle's ECU 101. In the case of certain temporary data, for example, the data can be stored on the HDD or other storage media until such time as the data is no longer needed.

In another embodiment, the transceiver 105 may be on on-board communication device or cellular modem. The on-board communication device may not require a cellular phone (e.g. nomadic device) to be paired with a BLUETOOTH transceiver to communicate to an off-board server. Instead, the on-board modem may have its own capability to communicate with an off-board network.

An in-vehicle camera 103 may be mounted in the vehicle to monitor occupants (e.g. a driver or passenger) within the vehicle cabin. The in-vehicle camera 103 may work with a driver status monitoring system (DSM) to monitor a driver. The in-vehicle camera 103 may be utilized to capture images of an occupant in the vehicle. The in-vehicle camera 103 may obtain facial information about an occupant, such as eye-movement of the occupant and head-movement of the occupant, as discussed further below. The in-vehicle camera may be a color camera, infrared camera, or time of flight camera.

A controller may receive driver status data from the DSM to determine an abnormal situation within the vehicle. The DSM employs one or more activity sensors such as a driver-facing camera, a health scanner, and an instrument panel to monitor activities performed by the driver. Based on the activity sensors, the driver status module may determine whether the driver is, for example, distracted, sick, or drowsy as the abnormal situation.

The in-vehicle camera 103 may be mounted at the meter console to capture the driver's face, especially the driver's eyes. The driver status module or ECU 101 may process data received from the driver-facing camera 103 and monitors whether the driver looks away from the road based on the driver's gaze direction. If the driver looks away, the driver status module or ECU 101 determines the abnormal situation. The driver status module or ECU 101 may also determine whether the driver is drowsy or alert based on how much the driver's eye opens and for how long.

A health scanner may be mounted on the steering wheel or suitable location which the driver touches. The health scanner scans the driver's heartbeat. The driver status module processes data received from the health scanner and monitors whether the driver is suffering from a severe physical condition or episode, such as a heart attack based on the heartbeat. If the driver is suffering from the serve physical condition or episode, the driver status module determines an abnormal situation.

While the driver assistance feature is activated, the driver assistance features may be cancelled or overridden depending on the driver's operation detected by driver operation sensors. When the depression degree of the acceleration/brake pedals or the operation torque of the steering wheel exceeds a predefined threshold, the driver override module determines that the driver is actively operating the vehicle. Then, the driver takes over the vehicle control from the driver assistance features.

The vehicle system 100 may include at least one external camera 107. The external camera 107 may be mounted in the rear-view mirror. The external camera 107 may also be facing out of the vehicle cabin through a vehicle's windshield to collect imagery data of the environment in front of the vehicle. The external camera 107 may be utilized to collect information and data regarding the front of the vehicle and for monitoring the conditions ahead of the vehicle. The camera 107 may also be used for imaging the conditions ahead of the vehicle and correctly detecting the positions of lane markers as viewed from the position of the camera and the presence/absence, for example, of lighting of the head lights of oncoming vehicles. For example, the external camera 107 may be utilized to generate image data related to vehicle's surrounding the vehicle, lane markings ahead, and other object detection. A vehicle may also be equipped with a rear camera (not shown) for similar circumstances, such as monitoring the vehicle's environment around the rear proximity of the vehicle.

The system 100 may also include a vehicle-to-vehicle or vehicle-to-infrastructure communication module (e.g. V2X module) 109. The V2X module 109 may be utilized to send and receive data from objects proximate to the vehicle. Such data may include data regarding the environment surrounding the vehicle or information about the object that the vehicle is communicating with utilizing the V2X module. In one scenario, the vehicle system 100 may have recognized that a user was squinting at an object outside of the vehicle. The vehicle system 100 may utilize the various cameras and sensors in the vehicle to identify that object. The V2X controller 109 may determine whether or not that object can be communicated with. In this scenario, the object may be a billboard or point-of-interest (POI) that has V2X capability to send information about the object, such as specials or detailed information that may be presented to occupants of the vehicle utilizing an HMI of the vehicle system 100. The POI may send such information utilizing the V2X infrastructure to the vehicle in response to a request from the vehicle.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine a location or current position of the vehicle.

The system 100 may also include a human-machine interface (HMI) display 115. The HMI display 115 may include any type of display within a vehicle cabin. Such HMI displays may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display message that the vehicle is prepared to brake and provide feedback to the user regarding the same. The HMI display 115 may utilize any type of monitor or display utilized to display relevant information to the occupants.

The instrument panel may be mounted interior of the vehicle to control various vehicle systems. For example, the system includes an air conditioner, a music player, a video player, and a GPS navigation. The driver status module processes data received from the instrument panel and monitors whether the driver is distracted. For example, when the instrument panel is being operated as the vehicle is traveling, the driver is involved in secondary tasks that are potentially distracting the driver. If the driver is distracted, the driver status module ECU may determine the abnormal situation.

In addition to providing visual indications, the HMI display 115 may also be configured to receive user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of component to perform in accordance with the user input.

Sensors, including the LIDAR sensors, radar sensors, etc, may be mounted anywhere on the vehicle. For example, it is possible for LIDAR sensors to be mounted on a roof a vehicle with a 360-degree view of the vehicle's surrounding. Furthermore, the various sensors may surround the vehicle to provide a 360-degree view of the vehicle. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors. The sensors may be utilized in conjunction with the ECU 101 to identify objects. For example, a forward LIDAR sensor and corner LIDAR sensor may be utilized. The forward LIDAR sensor may be used to determine what vehicle and objects are in the front peripheral of the vehicle. A corner lidar sensor may be utilized to also detect and classify objects and used to enhance a vehicle's peripheral view of the vehicle's surrounding. A corner LIDAR sensor may be utilized to also detect and classify objects and used to enhance a vehicle's peripheral view of the vehicle's surrounding.

The forward radar sensor may be mounted in the front bumper of the vehicle. The corner radar sensor may be mounted in the corner of the bumper. Radar sensors may be configured to detect and classify objects to enhance a vehicle's peripheral view of the vehicle's surrounding. The radar sensors may be utilized to help or enhance various vehicle safety systems. The forward radar sensor may be built into a front bumper of the vehicle to determine that an object is ahead of the vehicle. The corner radar sensor may be located in the rear bumper or the side of the vehicle. The corner radar sensor may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The controller 101 can receive information and data from the various vehicle components including the in-vehicle camera 103, external camera 105, the GPS 113 and the HMI display 115. The controller 101 utilize such data to provide vehicle functions that may relate to driver assistance, or autonomous driving. For example, data collected by the in-vehicle camera 103, 109 and the forward camera 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information). The controller may also be utilized with the internal camera 103 to identify facial features of an occupant of the vehicle, as explained in more detail below.

Figure 2:
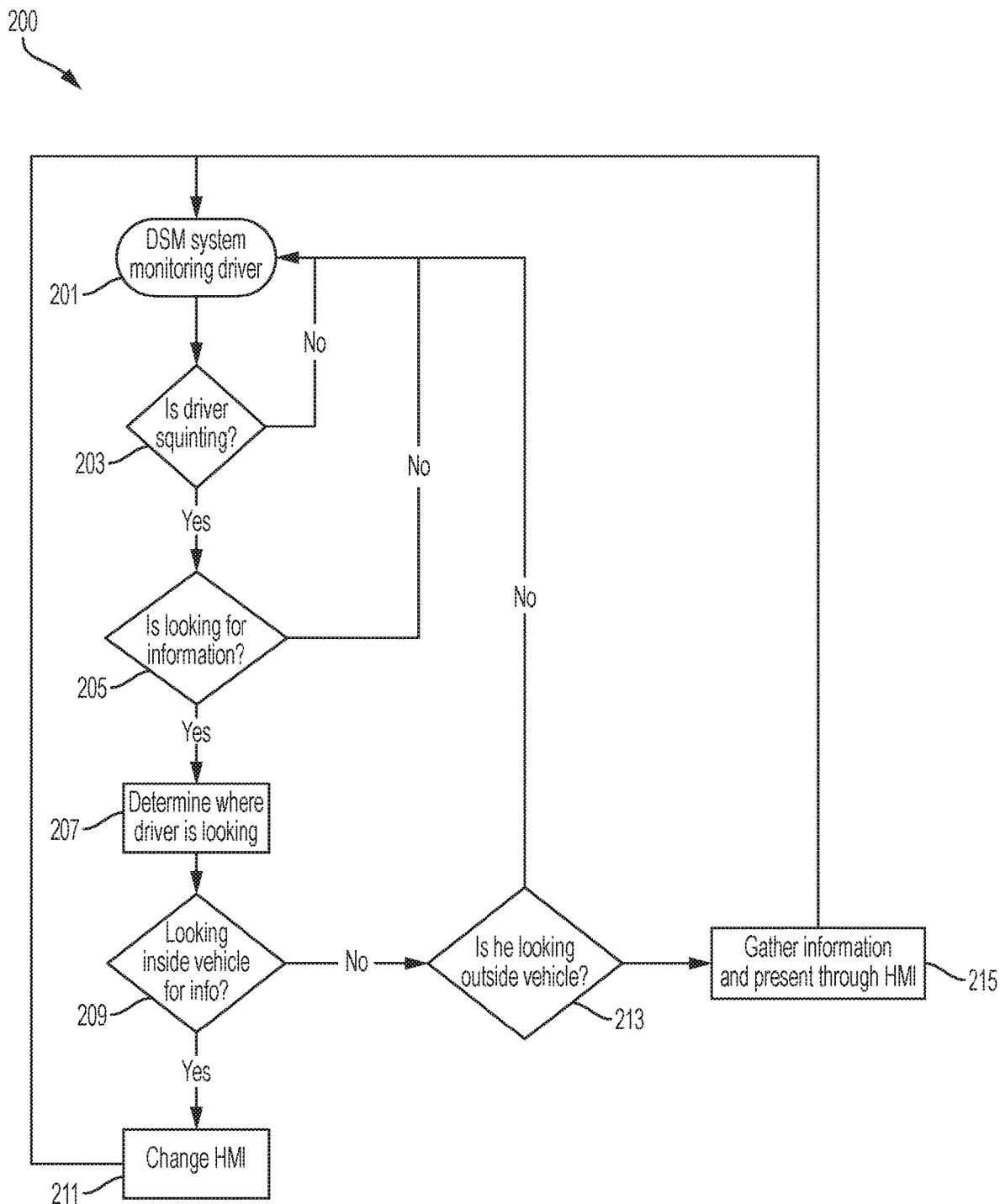
FIG. 2 illustrates a flow chart utilized to determine whether an occupant of a vehicle needs assistance in viewing information based on gazing and squinting data.

FIG. 2 illustrate an exemplary flow chart 200 of a driver status monitoring system (DSM) utilized to determine a strained eye of an occupant of a vehicle. The DSM may be monitoring a driver 201 utilizing the system described above and as shown in FIG. 1. The DSM may also be utilized to monitor other occupants of the vehicle, such as a passenger of the vehicle. The DSM may include various sensors, cameras, and processors/controllers to monitor various habits and activities of a driver.

In one example, the DSM may monitor if a driver is squinting 203. The DSM may utilize historical data of an occupant (e.g. driver or passenger) to determine a "normal-state" or default state of the driver. In one example, the default state may be simply a driver monitoring typical surroundings of a driving vehicle. The DSM may continue to monitor the driver 201 if no abnormal conditions of the occupant are identified. In another example, however, the DSM may identify an abnormal behavior from the occupant in response to data collected by the various sensors of the DSM. In one example, gazing data (e.g. data collected from a camera that that monitors the head-movement of the vehicle), may identify that a driver is looking around and outside the vehicle. Furthermore, the DSM may utilize facial recognition data to determine that the occupant's eyes are squinting. For example, historical information collected and stored regarding facial recognition data may identify that the user's eyes are in an abnormal state (e.g. squinting). If an occupant is determined to squint their eye as identified by the facial recognition data, the DSM may assume that the occupant is squinting to identify an object that is proximate the vehicle, but still out of range for the occupant (e.g. driver or passenger) to clearly identify what the object is that is proximate the vehicle. In such scenarios, the DSM system may further evaluate the occupant for other abnormal activities to identify certain situations. If the DSM determines that the occupant is not squinting, it may continue to monitor the occupant.

The DSM may determine if the occupant of the vehicle is looking for information 205. The DSM may utilize the gazing-data, head movement data, facial recognition data, and/or other data to determine if the user is looking for information. In one example, if the DSM determines from the gazing data that the occupant is looking out of their car. Next, the DSM may utilize the facial recognition data to identify that a user is squinting and looking at an object. By utilizing both the gazing data and facial recognition data that is derived from information taken from an in-vehicle camera, the DSM may determine that the occupant is looking for information. If the DSM determines that the user is not looking for information, it may continue to monitor occupants of the vehicle for any abnormal conditions. In certain embodiments, the DSM may analyze the facial area of an occupant utilizing a camera aimed at the occupant. The DSM may compare the current status of the user's facial movement and eye action (e.g. squinting or looking) as compared as to historical data that the system deems as a normal-state. The DSM may determine from such facial recognition data that an occupant's eyes have movement (e.g. squinting) that the occupant is looking for information, as compared with the normal state.

If the DSM proceeds to determine that the occupant is looking for information, it may determine where the driver is looking for information 207. A camera inside of the vehicle's cabin may look at an occupant's head to evaluate where the occupant's eyes are looking and movement of the head. Data may include parameters to the evaluate pixels taken from an image of the eye area to identify where an occupant is looking or if an occupant is squinting. The DSM may work in conjunction with the VCS and utilizing the gazing-data, head movement data, facial recognition data, and/or other data to determine where the occupant is looking for information. For example, if the occupant's head is turned to a certain direction, the DSM may monitor this information and determine that the occupant is looking for information in that direction or vicinity.

The DSM or in-vehicle camera (or other sensor) may proceed to determine if the occupant is looking for information inside of the vehicle at step 209. As described above, DSM may work in conjunction with the VCS and utilizing the gazing-data, head movement data, facial recognition data, and/or other data to determine where the occupant is looking for information. The DSM collects gazing-data and head movement data that shows the occupant is looking inside of the vehicle. For example, the DSM may collect data and information utilizing a camera aimed at the occupant that the occupant is looking towards objects within the vehicle. The DSM may then monitor the occupant to determine if the facial recognition data or other data determines that the occupant is straining (e.g. eye's are squinting) in trying to determine what the information is. For example, if the occupant has bad eye-sight, the occupant may be squinting at a vehicle display to read textual information on that display. The DSM may recognize this by the data and information collected by the DSM.

If the DSM has determined that the occupant is looking at information inside of the vehicle, the DSM may communicate with a vehicle computer system to change the human machine interface (HMI) at step 211. The DSM may determine from information gathered by an in-vehicle camera or another sensor that the occupant is focusing on an object within the vehicle. If the occupant is focusing and straining (e.g. squinting) to decipher that information the system may determine what the information is that the driver is looking at and assist the occupant to view the information. In one scenario, the system may determine that the driver is straining to view textual information on a display of the multimedia system. Upon determining that the occupant is straining to view this information, the system may respond by increasing a font size or image of the textual information. Thus, if the font sized is increased, it may be easier for the occupant to identify or decipher the information without straining. If the DSM continues to sense that the occupant is straining (e.g. from utilizing the facial-recognition data or head movement data or gazing data), it may continue to increase the size and font to assist the occupant. The system may be configured to continue to increase the font until it detects that there is no straining on the occupant. The system may also be able to detect other in-vehicle objects within the vehicle-cabin (e.g. books, maps, papers, newspapers, tablets, etc.) that the user is straining to identify and assist in such information.

In another scenario, the system may determine that the occupant is not looking at information inside of the vehicle and instead determine whether the occupant is looking at information outside of the vehicle at step 213. The DSM may determine from information gathered by an in-vehicle camera or another sensor that the occupant is focusing on an object outside the vehicle. If the occupant is focusing and straining (e.g. squinting) to decipher the information outside of the vehicle, the system may determine what the information the occupant is looking at and assist the occupant to view the information. In one scenario, the system may determine that the occupant is straining to a road sign that the vehicle is approaching. The system may utilize the data gathered by the sensors (e.g. gazing-data, head movement data, facial recognition data, and/or other data) to determine what outside object the occupant is looking at. Upon determining that the occupant is straining to view the road sign, the system may gather information about the object (e.g. road sign) to facilitate the occupant to identify the information.

The DSM may work in conjunction with the VCS to gather information regarding an object proximate the vehicle and present such information on the HMI in the vehicle at step 215. The DSM may utilizing the gazing-data, head movement data, facial recognition data, and/or other data to determine where the occupant is looking for information. When the DSM determines that the occupant is looking outside the vehicle, it may work with various external cameras or in-vehicle cameras that monitor the environment outside of the vehicle to determine what exact object the occupant is looking at. For example, the DSM may determine that the occupant is looking outside the vehicle, and then work with a camera pointed out to the front of the vehicle (e.g. mounted in the rear-view mirror but facing out of the windshield) to determine what object the occupant is looking at. The camera monitoring the vehicle environment may identify the object and collect information (e.g. images) that may be utilized to assist the occupant in retrieving additional information regarding the object. For example, once the object is identified, a VCS may be working in conjunction with an off-board server to collect additional information about the object. For example, if a billboard sign is recognized by the camera, the VCS may utilizing GPS data and information on point-of-interest database to identify specifics about the billboard to download and present to the user. In another embodiment, however, the VCS may identify a billboard or another sign located outside of the vehicle in which a server does not have any additional information identified about that object. The VCS may work in conjunction with sensors mounted outside of the vehicle (e.g. cameras, Lidar sensor, radar sensors) to collect information (e.g. images) that may be presented to the user. Thus, a zoomed-in image of the billboard may be presented to the user on a display in the vehicle cabin.

Thus, if the font sized is increased, it may be easier for the occupant to identify or decipher the information without straining. If the DSM continues to sense that the occupant is straining (e.g. from utilizing the facial-recognition data or head movement data or gazing data), it may continue to increase the size and font to assist the occupant. The system may be configured to continue to increase the font until it detects that there is no straining on the occupant. The system may also be able to detect other in-vehicle objects within the vehicle-cabin (e.g. books, maps, papers, newspapers, tablets, etc.) that the user is straining to identify and assist in such information. For example, the system may utilize an in-vehicle camera to identify that the user is looking at an object out of the driver side window, or in another scenario, a passenger side window. The system may utilize an external camera or sensor located on that side of the vehicle (e.g. either driver side or passenger side) to collect additional information about that object (e.g. utilize a camera on the driver side door panel or mirror to zoom-in on object and collect information about that object).

Figure 3:
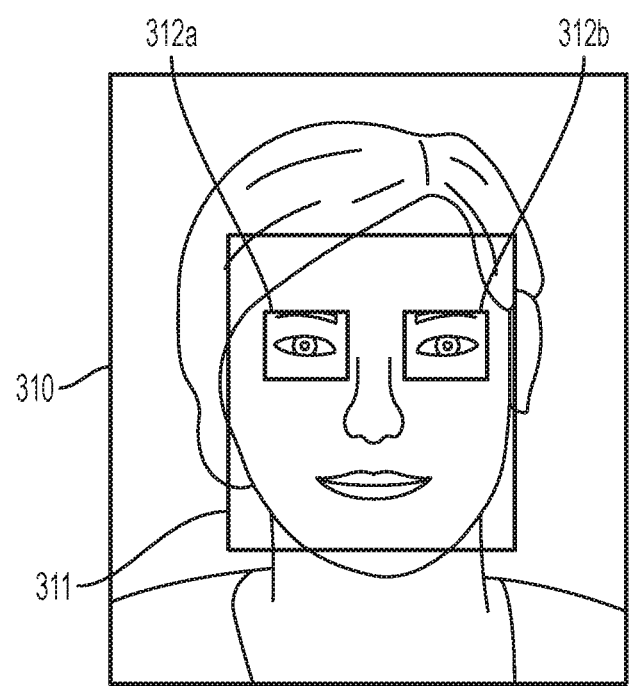
FIG. 3 illustrates an example image processing method for obtaining facial parameters from an image of a user according to this disclosure.

FIG. 3 illustrates an example image processing method for obtaining facial parameters from an image of a user according to this disclosure. The image processing method is used to obtain a facial parameter related to the user eye area, as described above with reference to the flow chart shown in FIG. 2, or is used to obtain other types of facial parameter.

As shown in FIG. 3, the image 310 is processed using a face detection algorithm to detect a face area 311 within the image, and to detect eye areas 312*a*, 312*b* within the face area 311. The pixels within the eye areas 312*a*, 312*b* then are analyzed to obtain a value of the facial parameter, as described herein.

Other examples of facial parameters that are detected from the captured image 310 include, but are not limited to, a distance parameter relating to a distance between the user and the display, one or more demographic parameters relating to the user, and a glasses parameter indicating whether the user is wearing glasses. The distance parameter is used to determine whether the user is too close or too far from the display, either of which indicate that the user is experiencing viewing difficulty.

In some embodiments, a face recognition algorithm is used to detect certain types of expression or facial movements that indicate viewing difficulty. For example, frowning, or wrinkling of the skin near the eyes indicating squinting, is a sign that the user is experiencing viewing difficulty. In such embodiments, the facial parameter includes one or more flags for different predefined facial characteristics that are indicative of a user experiencing viewing difficulty. The value of a flag is set to 'TRUE' if that facial characteristic has been detected, and it is determined that the user is experiencing viewing difficulty if a threshold number (such as one or more) of the flags in the facial parameter are set to 'TRUE'. For example, the facial parameter includes two flags relating to frowning, squinting, and wrinkling near the eyes, and if both flags are 'TRUE' it is determined that the user is experiencing viewing difficulty.

For example, the distance parameter may be obtained based upon the apparent size of the user's face in the captured image. If the apparent size of the face, which can be measured in terms of linear dimensions or an area, is greater than a maximum threshold value as a fraction of the total image size, it is determined that the user is too close to the display. Similarly, if the apparent size of the face is lower than a minimum threshold value as a fraction of the total image size, it is determined that the user is too far from the display. In either of these outcomes, it is assumed that the user is experiencing difficulty visually resolving the displayed content. On the other hand, if the apparent size of the face is between the minimum and maximum thresholds, it is assumed that the user is not experiencing viewing difficulty.

The demographic parameters or data may include, for example, estimates of the user's age, gender, or race. Such parameters or data may be used to determine whether the user falls into any demographic categories associated with a high risk of eyesight problems. For example, in some embodiments it is assumed that the user is experiencing viewing difficulty, in response to a determination that the user being identified in a high-risk demographic category. In such embodiments, corrective action, such as increasing the display brightness, or font and image sizes, may be taken automatically without checking other facial parameters.

Figure 4A:
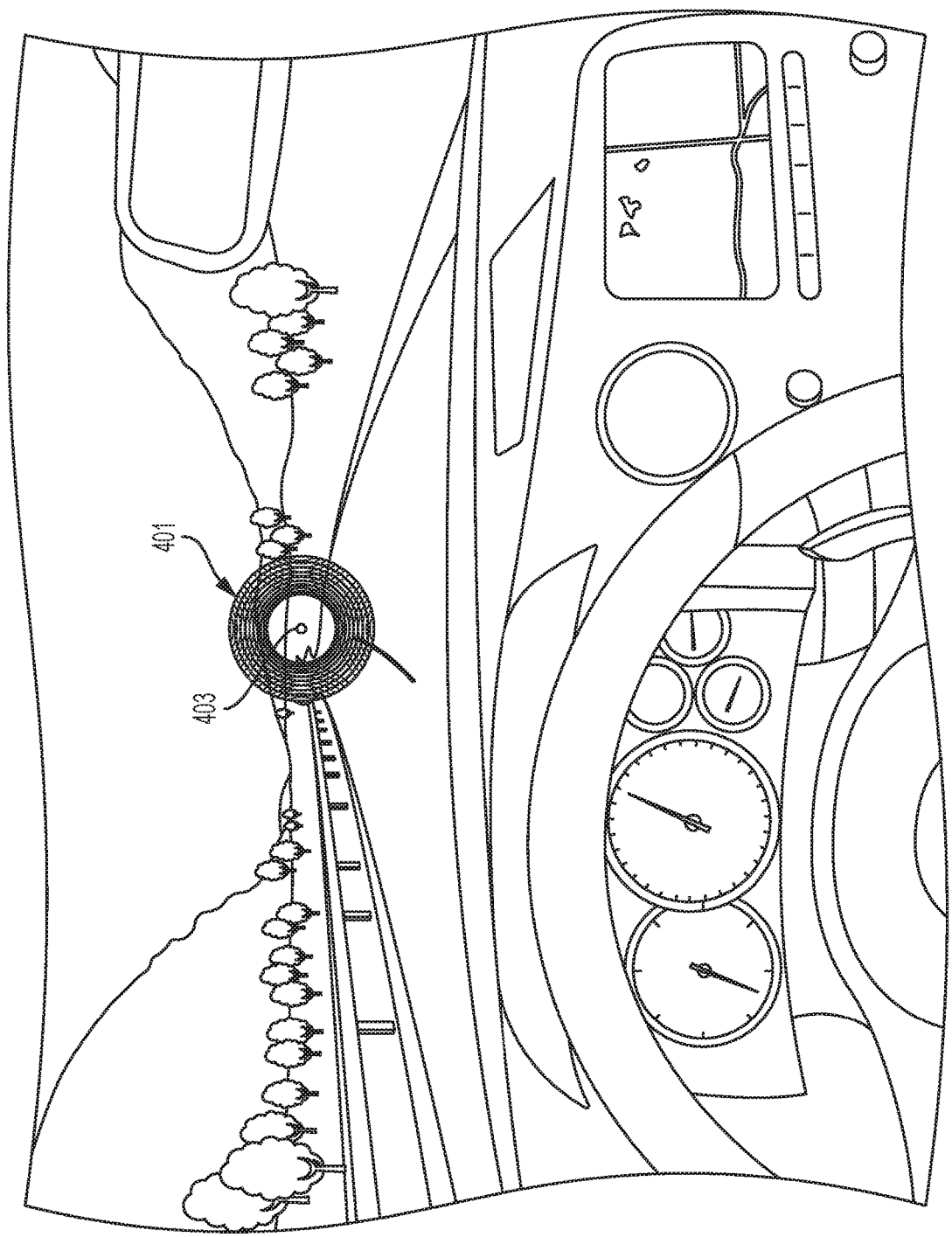
FIG. 4A illustrates an example of an environment of an occupant of the vehicle in one embodiment.

FIG. 4A is an example diagram of a vehicle's DSM survey evaluating the proximate environment of the vehicle. As shown in FIG. 4A, the occupant (e.g. a driver) may be looking out of a windshield, especially in a driving situation. As shown in the situation in FIG. 4A, the vehicle may be driving on a road. A camera that is mounted to view a proximal area of the vehicle may identify a target object 401. The camera may be mounted outside of the vehicle or may be mounted inside of the vehicle but viewing out of the vehicle (e.g. a camera mounted in the rear view mirror). The target object 401 in one scenario may be a road sign 403. The camera may then select to collect information about the target object 401, such as using a zoom feature of the camera to collect detailed images from a road-side object from a far distance. Though not shown in FIG. 4A, an in-vehicle camera or DSM may be monitoring a driver to determine if the user is looking at an object.

Figure 4B:
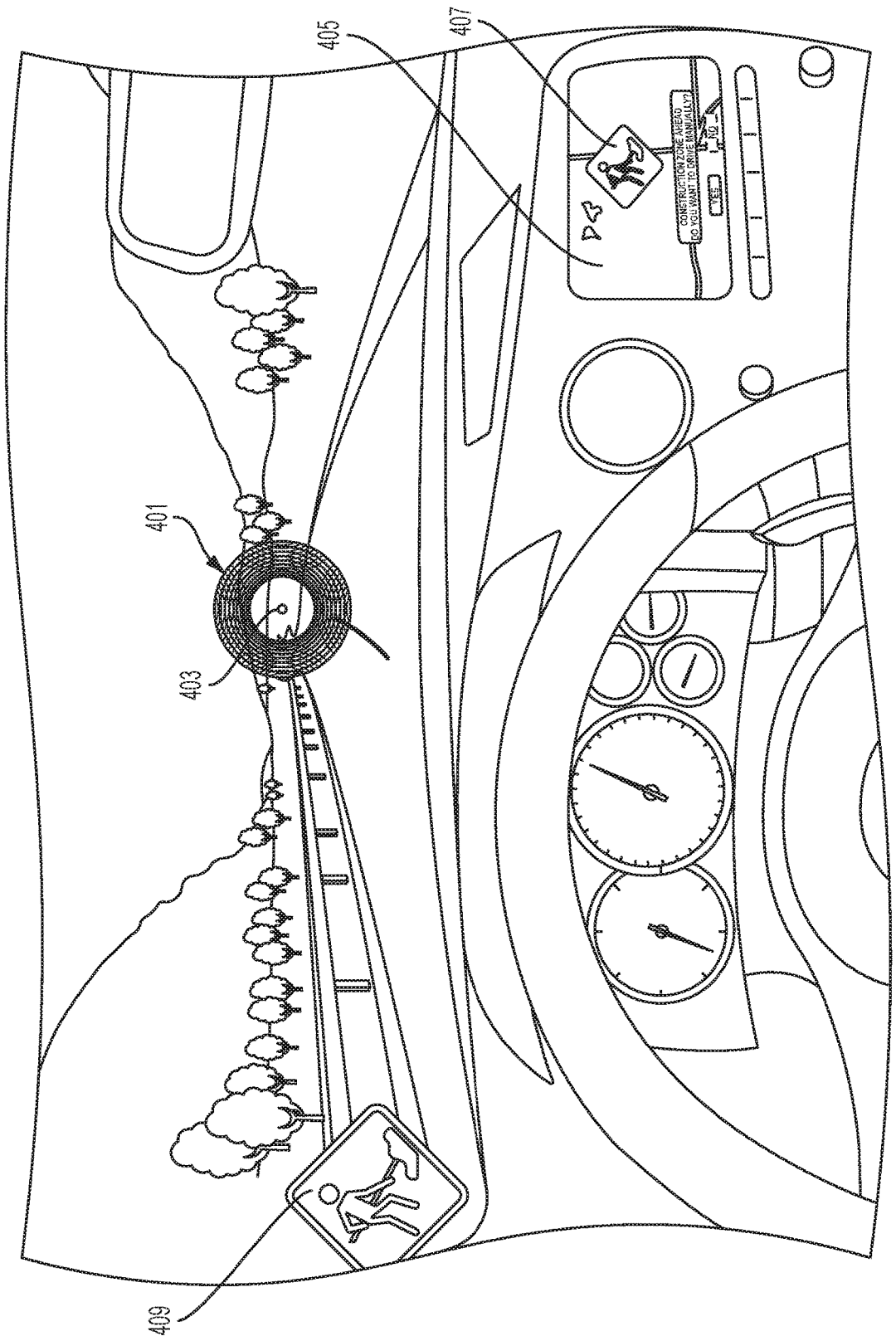
FIG. 4B illustrates an example of the vehicle HMI assisting an occupant.

FIG. 4B is an example of a vehicle's HMI responding to identification of a squinting-scenario from the DSM. The occupant (e.g. a driver) may be looking out of a windshield, especially in a driving situation. As shown in the situation in FIG. 4B, the vehicle may be driving on a road. A camera that is mounted to view a proximal area of the vehicle may identify a target object 401. The camera may be mounted outside of the vehicle or may be mounted inside of the vehicle but viewing out of the vehicle (e.g. a camera mounted in the rear view mirror). The target object 401 in one scenario may be a road sign 403 or another object 403. The camera may then select to collect information about the target object 401, such as using a zoom feature of the camera to collect detailed images from a road-side object from a far distance. While the object 403 may be difficult to identify, the vehicle's camera may be able to zoom into the image to receive a detailed road sign 409. The detailed road sign 409 may be a zoomed image of the object 403 Though not shown in FIG. 4B, an in-vehicle camera or DSM may be monitoring a driver to determine if the user is looking at an object.

The detailed road sign 409 may be displayed on various displays in the vehicle. For example, information regarding the road sign 403 may be displayed on a vehicle navigation system 405. The vehicle navigation system 405 may display information 407 regarding the object 403. Such information 407 may include a zoomed-image of the object, detailed information about the object (e.g. text information describing the object), or alternative routing information based on the object 403. Such information 407 may be retrieved by an off-board server, as described above.

In an alternative embodiment, the in-vehicle camera or sensor may keep track of where a user is looking as well as the head movement of the user. The DSM may utilize the gazing-data, head movement data, and other data to determine if the user is looking for information in a certain direction proximate the vehicle. A vehicle computer system may then utilizing such data to identify which display within the vehicle is ideal to output to the user. For example, the vehicle computer system may determine that the user is looking straight, and therefore, output information in a display in the instrument panel or in a heads-up display. In another scenario, the vehicle computer system may determine that a driver is looking to the right a little bit and in the vicinity of a multimedia display or nav display. The vehicle computer system may output information on the nav display/multimedia display. Thus, the vehicle computer system may select and identify a multimedia display in response to the head-gazing data or information regarding head movement of an occupant in the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system in a vehicle, comprising:
   a first sensor configured to survey an environment proximate to the vehicle, including an object outside of the vehicle and to obtain data indicative of image information of the object outside the vehicle;
   a second sensor located within a vehicle cabin and configured to obtain data indicative of facial information of an occupant of the vehicle; and
   a processor in communication with the first and second sensors and programmed to output information regarding the object on a display of the vehicle system in response to the data indicative of the facial information indicating that the occupant is viewing the object outside of the vehicle, wherein the processor is further programmed to output a graphical image of the object on the display utilizing the data indicative of image information in response to the facial information indicating that the occupant is viewing the object outside the vehicle.

2. The vehicle system of claim 1, wherein the second sensor is further configured to obtain data indicative of head-movement information of the occupant and the processor is further programmed to identify that the occupant is viewing the object outside of the vehicle in response to utilizing at least the data indicative of the head-movement information.

3. The vehicle system of claim 1, wherein the processor is further programmed to output information regarding the object in response to the data indicative of facial information indicating a squinting action of the occupant.

4. The vehicle system of claim 1, wherein the processor is further programmed to output audible information regarding the object.

5. The vehicle system of claim 1, wherein the processor is further configured to identify the object utilizing the first sensor and the data indicative of facial information.

6. The vehicle system of claim 1, wherein the information includes text describing the object.

7. The vehicle system of claim 1, wherein the processor is further configured to retrieve information of the object utilizing an off-board server in communication with the vehicle system.

8. The vehicle system of claim 1, wherein the processor is further programmed to select the display of the vehicle system to output the information of the object in response to data indicative of head-movement information obtained from the second sensor.

9. The vehicle system of claim 1, wherein the object is a road sign, point-of-interest, or billboard.

10. The vehicle system of claim 1, wherein the information of the object on the display of the vehicle system includes an image of the object.

11. The vehicle system of claim 1, wherein the information of the object on the display of the vehicle system includes textual information of the object.

12. A method implemented in a system of a vehicle, comprising:
    determining that an occupant of the vehicle is squinting utilizing data generated from one or more vehicle sensors;
    identifying, via the one or more vehicle sensors, an object proximate to the vehicle that the occupant is squinting at in response to the squinting of the occupant; and
    output, on a display of the system, information regarding the object located outside the vehicle in response to the squinting of the occupant.

13. The method of claim 12, wherein the method includes the steps of:
    determining head movement of the occupant in response to data generated from the one or more vehicle sensors; and selecting the display to output the information in response to the head movement of the occupant.

14. The method of claim 13, wherein the display is at least one of an instrumental panel, navigation display, or heads-up display.

15. The method of claim 13, wherein the method includes the step of identifying a location of the object.

16. The method of claim 12, wherein the method includes the step of identifying via the one or more vehicle sensors an in-vehicle object that the occupant is viewing in response to the squinting.

17. The method of claim 13, wherein the method includes the step of outputting audible information regarding the object.

18. The method of claim 13, wherein the information regarding the object includes an image of the object.

19. A driver assistance system of a vehicle comprising:
one or more sensors configured to monitor an occupant of the vehicle utilizing at least information related to eye movement of a driver and identify one or more objects proximate to the vehicle and outside the vehicle; and
a controller in communication with the one or more sensors and configured to perform a driver assistance feature based on a target behavior, wherein the target behavior is defined based on an environment surrounding the vehicle, wherein the controller is configured to activate a driver assistance feature to send instructions to output an image indicative of the object on a display of the vehicle in response to the information related to eye movement indicating the driver squinting at the object.

* * * * *